(No Model.) 3 Sheets—Sheet 1.

B. S. BENSON.
AIR PURIFIER.

No. 402,714. Patented May 7, 1889.

WITNESSES:
Fred G. Dieterich
Jason C. Kennon

INVENTOR:
B. S. Benson
BY Munn & Co.
ATTORNEYS.

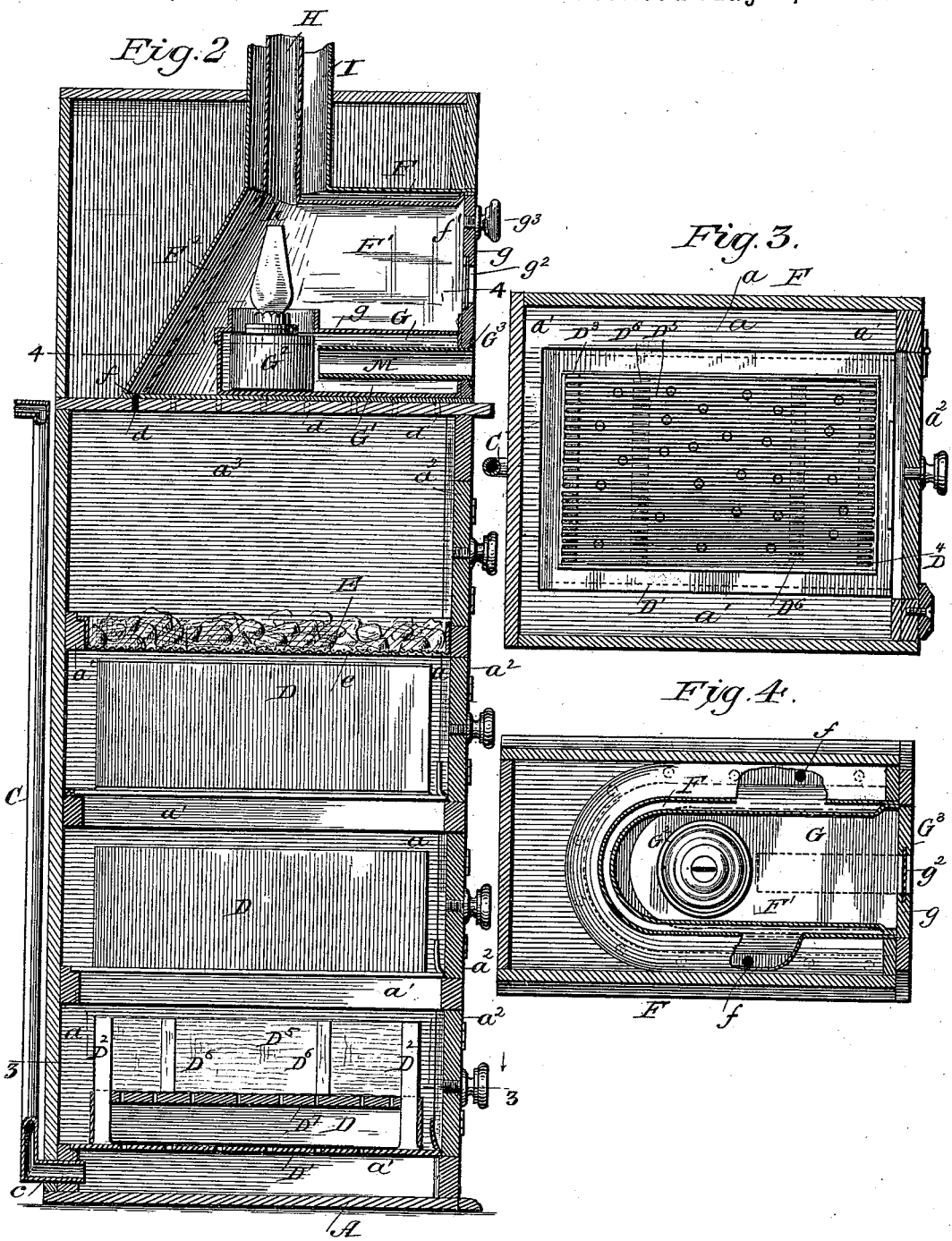

(No Model.)  3 Sheets—Sheet 3.

B. S. BENSON.
AIR PURIFIER.

No. 402,714. Patented May 7, 1889.

WITNESSES:
Fred G. Dieterich
John E. Kenon

INVENTOR,
B. S. Benson
BY
ATTORNEYS.

UNITED STATES PATENT OFFICE.

BENJAMIN S. BENSON, OF BALTIMORE, MARYLAND.

AIR-PURIFIER.

SPECIFICATION forming part of Letters Patent No. 402,714, dated May 7, 1889.

Application filed August 29, 1888. Serial No. 284,105. (No model.)

*To all whom it may concern:*

Be it known that I, BENJAMIN S. BENSON, residing in Baltimore, in the State of Maryland, have invented a certain new and useful Improvement in Air-Purifiers, of which the following is a specification.

My invention relates to certain means for purifying the atmosphere for respiration, and it is more especially adapted for use in sick or sleeping rooms; and it consists, essentially, in extracting the poisonous moisture and gases contained in the air, which are injurious to health, by forcing the air in contact with antiseptics and thoroughly purifying the same before it is inhaled by the patient; and it further consists in the peculiar construction and novel combination of parts, as will be hereinafter fully described in the annexed specification, and particularly pointed out in the claims, reference being had to the accompanying drawings, in which—

Figure 1:
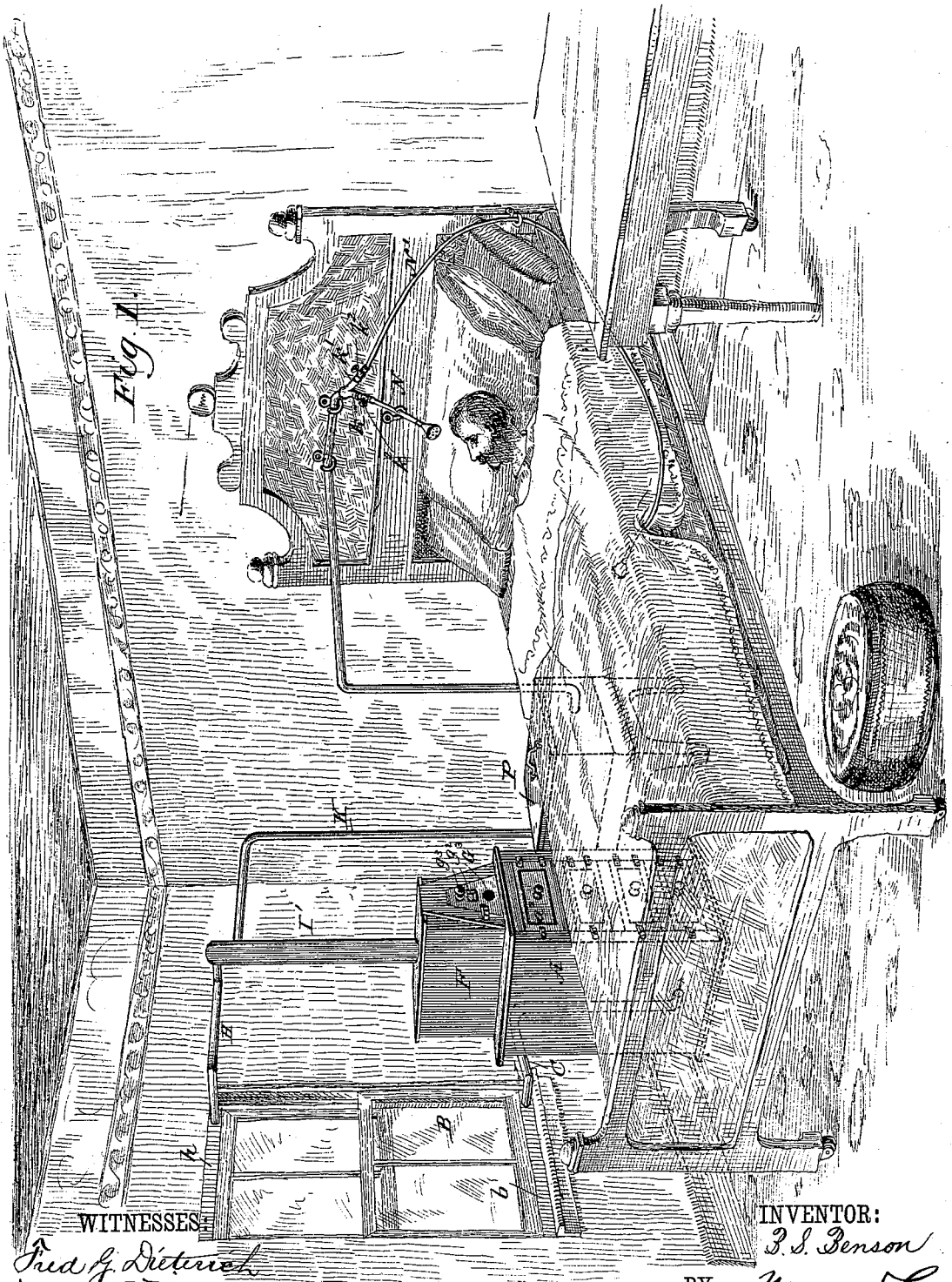
Figure 5:
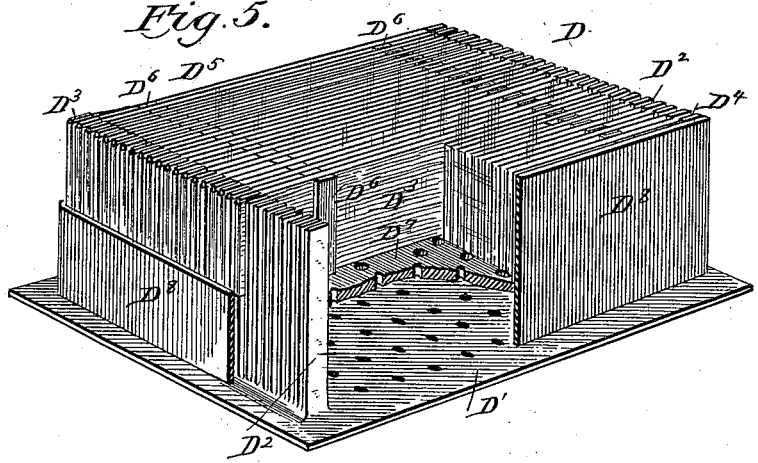
Figure 6:
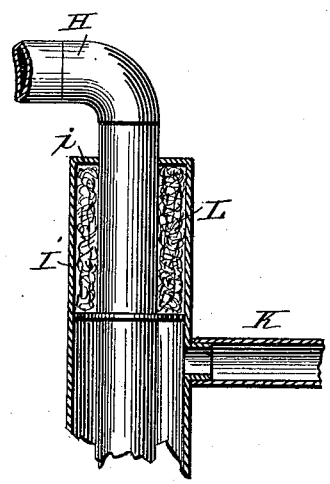

Figure 1 is a perspective view of the improvement, showing the same in operative position. Fig. 2 is a central vertical section of the filtering-box and the heating-chamber. Fig. 3 is a horizontal section on the line 3 3, Fig. 2. Fig. 4 is a similar section of the heating-chamber, taken on the line 4 4, Fig. 2, parts being broken away. Fig. 5 is a detail view of one of the filtering-webs. Fig. 6 is a detail section hereinafter referred to.

I will first proceed to describe my improvement in a general manner, and then specifically describe and point out the various parts in detail.

In the practical application of the improvement I arrange a filtering-case in the room, preferably near a window, which case is formed "bureau-like," and is provided with a number of compartments into which are entered a series of filtering-webs, which are coated with a suitable absorbent, usually gypsum, which has a great affinity for water and fixes the ammonia in the atmosphere, and through these filtering-webs the air is forced. The air is taken in at the window through a hole in the lower window-strip, and passes down a pipe at the rear of the filter-case and enters said case below the first or lowest filtering-web. The said filtering-webs are so arranged within the case that the air can only escape by passing through them. The air, after passing through the several antiseptics, escapes through apertures in the top of the case and enters a heating-chamber placed upon said top, which heating-chamber is provided with a series of apertures which are arranged to align with the apertures in the case-top, and through the said apertures the air passes and enters the heating-chamber proper. This chamber is provided with a lamp for heating and with an extension or drum which projects above the chamber, and centrally within this drum is arranged a combustion-pipe, which passes through the drum at the top, said pipe passing through the upper window-strip, as clearly shown in Fig. 1 of the drawings, thereby discharging the products of combustion produced by the lamp to the outside of the building. To the upper end of the air-drum is connected the pure-air pipe, which is passed through a cooling-box, and thence to the head-board of the bed, where it is formed into branch pipes, to which are connected flexible tubes, one of which extends to near the patient's head, while the other is of a sufficient length to permit of its insertion beneath any portion of the bedclothes to supply the body with purified air when so desired. Said branch pipes are each provided with a suitable stop-cock, whereby the flow of air may be regulated.

Having thus generally outlined the construction and operation of my improvement, I will now specifically describe the several parts in detail.

In the drawings, A indicates the air-filtering case, which is placed preferably near the window B, which is provided with detachable strips $b$ $b'$, arranged, respectively, in the lower and upper ends thereof, as shown. A pipe, C, projects at one end through the lower window-strip, $b$, and extends down in rear of the case A and enters the same at the lower edge thereof, as at $c$, and through which pipe the outside air is admitted to the case A.

The case A is formed with a series of compartments, $a$ $a$ $a^3$, formed by the ledges $a'$ $a'$, and which are each provided with a door, $a^2$ $a^2$. Into each of the compartments $a$ is placed a filtering-web, D, the specific construction of which will be explained farther on. The top compartment, $a^3$, is provided with a pocket, E, which is formed with a fine-wire mesh bottom, $e$, upon which is placed any desired medicated substance which may be required, according to the nature of the disease of the patient.

A series of apertures, d d, are arranged in the top A' of the case, which apertures register with a series of similarly-arranged apertures, f, in the hot-air chamber F² of the case F, which is placed upon the top of the case A, as shown.

The case F consists of the heating-chamber F', provided with an open forward end, f', into which is slid the lamp-supporting device G, provided with a gate, g, which snugly fits the opening f' and effectually closes the same. A combustion-pipe, H, connects with the heating-chamber at its rear end, h. Surrounding the heating-chamber is the hot-air chamber I, which passes around three of the sides of said chamber F', and is formed at its upper end with a drum portion, I', which surrounds the combustion-pipe H and extends up a short distance above the heating-case proper, the upper end, i, of same being closed, to which upper portion is connected the pure-air pipe K, which will be presently described.

To form a tight joint at the upper end of the drum with the combustion-pipe, it is preferred to form said joint with an asbestus packing, L, to permit of the expansion of the inside or combustion pipe, H, said joint being shown in detail in Fig. 6, said pipe extending to the outside of the building through the strip b, as shown.

The lamp-supporting device G is formed of a hollow base, G', in the inner end of which is arranged the oil-chamber G², from which extends upward through the cover g the lamp-chimney. To the forward end of the hollow chamber is secured a portion or gate, g, which corresponds to the opening f', formed in the front edge of the heater-case F, and securely closes the same when the lamp is slid into place. A horizontal air-tube, M, extends from the front G³ and extends within the base G' close up to the oil-chamber, and thereby cools said chamber. The portion g is also provided with a sight-hole, g², and a hand-knob, g³, as shown in Fig. 3. The sight-hole g² permits the ready indication of the lamp when burning.

The pure-air pipe K extends from the hot-air drum I', and is detachably secured to the head-board of the bed, and is formed near such connection with branch pipes k k', provided with stop-cocks k². Flexible tubes N N' are connected to the branch pipes, one of which, N, is a short tube and extends to a point near the patient's head, while the other, N', is somewhat longer to permit of its ready placement under any portion of the bed-clothes, so as to apply a current of purified air to the person of the patient. In passing the pure-air pipe from the drum I' to the head-board it is preferred to pass the same through a cooling-chamber, P, (which may be a closed box filled with ice,) and thereby thoroughly cool the air before it is discharged near the patient. By arranging the end of the pure-air pipe in the manner described it will be readily understood that the supply of the air may be easily regulated, and by the long flexible tube the air may be communicated to any portion of the body and be absorbed by the skin of the patient when the room is unpleasantly warm.

The air-filtering webs D, previously referred to, one of which is illustrated in detail in Fig. 5 of the drawings, consist each of a metallic foraminous plate, D', and a series of upwardly-extending fingers, D², arranged close together near each end of the plate D'. The web portion D³ consists in securing to one of the outside fingers, D², as at D⁸, a strip of muslin or tape, which is passed alternately around the fingers D², passed backward and forward from one finger to the other until the end thereof reaches the finger D⁴, diagonally opposite the finger D⁸. Spacing-strips D⁶ are arranged between the different layers of tape to keep them apart. The webs extend about one-half the depth of the fingers D², and are braced in place by means of a foraminous strip, D⁷, disposed between the lower edges of the webs and the foraminous plate D', and a metallic case, D⁸, is slid over the webs and prevents the heat from passing out between the sides of the webs while they are being dried.

It will be understood that the several webs are thoroughly soaked or coated with gypsum or some other desired chemical. The several webs, after having been coated with the gypsum, are thoroughly dried before they are slid into the filtering-case.

The complete operation of the apparatus is as follows: The several parts having been placed in proper position in the room, the several webs having been dried and placed in the filtering-case, and the same connected to the outside atmosphere, as shown, the lamp is then placed in the heating-box. The air which is taken in at the bottom of the filter-case passes upward through the filter-webs, which take up the moisture in the air, which then passes through the medicated screen-pocket and out through the apertures in the top into the heating-chamber which surrounds the lamp, and is there heated to about 200° Fahrenheit, which effectually kills any germs which may be in the air, and thus assists in effectually purifying the same. The air then passing up the drum escapes through the pure-air pipe. The heat from the lamp forms a partial vacuum in the air-drum, and thereby allows the atmospheric pressure to force the air through the filters and up through the hot-air chamber. It will be understood that the air remains hot only in the heating-case, as it immediately begins to cool after leaving said chamber; but to insure of its being positively cooled before it reaches the patient it is passed through a cooling-chamber, as before described. It is then passed to the patient, the flow thereof being easily regulated. The cooling-box, however, may be dispensed with when the normal temperature of the room is at a low degree.

While I have shown and described the air-inlet as entering the filtering-case at the lower portion thereof, it is manifest that the air may be taken into the said case at any part thereof, and the several filtering-webs so arranged within said casing that the air shall pass through them before leaving the case.

From the foregoing it will be seen that the construction of my air-purifier is an exceedingly simple one, and of a small cost. It can be easily manufactured, and is very effectual in its desired operation.

Having thus described my invention, what I desire to claim and secure by Letters Patent is—

1. In an air-purifying apparatus, the combination of a filtering-case provided with a fresh-air inlet at one end and outlets at its opposite end, a series of detachable filtering-webs disposed within the casing, forming compartments therein between the air inlet and outlet openings, and a heating case or drum having a hot-air chamber, said chamber communicating with the outlet-openings, and a discharge-pipe connected with said chamber, substantially as and for the purpose specified.

2. In an air-purifying apparatus, the combination, with the filtering-case provided with a fresh-air inlet at its lower end, a series of movable filtering-webs arranged therein, and outlet-openings in its top, of a heating-case disposed above said case, provided with air-inlet openings in its bottom arranged to align with the openings in the top of the filtering-case, said heating-case provided with a hot-air chamber having an extension or drum, I', a combustion-pipe arranged within said drum and connected to the heating-chamber, said drum provided with a pure-air outlet-pipe, all arranged substantially as described.

3. In an air-purifying apparatus, the combination, with the hot-air case provided with air-passages for the filtered air, said case consisting of a heating-chamber provided with a combustion-outlet pipe and a hot-air space surrounding said heating-chamber, provided with a drum and a pure-air outlet, of a detachable lamp-support, said support consisting of a horizontal hollow chamber provided with the oil-chamber at its forward end, an extended portion or gate at its outer end adapted to fit the opening of the heating-chamber, and a horizontal air-tube extending from said gate portion and extending to the oil-chamber, substantially as and for the purposes set forth.

4. An air-purifying apparatus consisting of a filtering-case adapted to receive the fresh air at its lower end, provided with a series of movable filtering-webs arranged in the interior of said case, and air-outlets in its top, a heating-chamber arranged above said top and having air-passages aligning with the air-openings in the filter-top, said heater provided with an outlet for the pure air and an outlet for the products of combustion, and a cooling-box arranged to surround a portion of the pure-air pipe, substantially as and for the purposes described.

5. An air-purifying apparatus consisting of an air-filtering case having an air-inlet pipe connected with the outside of the building, a heating-case arranged above said filter-case, air-passages provided in said case and heating-box, said heating-case having a combustion-pipe connected to the heating-chamber and extending outside the building, a hot-air drum surrounding said heating-chamber, and a pure-air pipe connected with said drum, substantially as and for the purpose described.

6. The combination, with the air-filtering case A, the heating-case connected therewith, said heating-case provided with a hot-air drum, of the pure-air pipe connected therewith, said pipe provided with branch pipes at its outer end, said branch pipes provided with stop-cocks, and tubes connected with said branch pipes, substantially as and for the purpose specified.

7. In an air-purifying apparatus, substantially as described, the filtering-webs D, said webs consisting of a foraminous base-plate, D', a series of fingers, $D^2$, projecting upward from said base-plate, and a web-body of muslin or tape connected to said fingers, substantially as shown and described.

8. The filtering-webs D, said webs consisting each of a foraminous base-plate, D', upwardly-projecting finger $D^2$, a web-body of muslin or tape connected to said fingers, a perforated brace-board disposed between said web portion and base-plate, and a retaining metallic casing surrounding said web portion, substantially as shown and described.

9. An air-filtering apparatus consisting of the heating-case F, provided with an air-inlet, said inlet entering a heating-drum formed in said case, a combustion-pipe arranged in connection with the combustion-chamber and extending within said drum and passing through said drum to the outside of the building, and a fresh-air pipe connected with the drum and adapted to be secured to the headboard of a bed, substantially as and for the purpose described.

10. In an air-filtering apparatus, the combination, with the filtering-case and heating-case, substantially as shown and described, said filtering-case provided with an air-inlet pipe extended through the window B, said heating-case provided with a combustion-pipe extending through said window, of detachable window-strips arranged at the top and bottom of said windows, said strips formed with apertures through which the pipes C and H extend, substantially as and for the purpose described.

BENJAMIN S. BENSON.

Witnesses:
FRED G. DIETERICH,
SOLON C. KEMON.